(12) United States Patent
Yano et al.

(10) Patent No.: US 10,972,308 B2
(45) Date of Patent: Apr. 6, 2021

(54) COMMUNICATION DEVICE AND AUTOMOBILE INCLUDING THE SAME

(71) Applicant: HITACHI AUTOMOTIVE SYSTEMS, LTD., Hitachinaka (JP)

(72) Inventors: Tomohiko Yano, Tokyo (JP); Hiroki Yamashita, Tokyo (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 23 days.

(21) Appl. No.: 16/617,872

(22) PCT Filed: Apr. 17, 2018

(86) PCT No.: PCT/JP2018/015794
§ 371 (c)(1),
(2) Date: Nov. 27, 2019

(87) PCT Pub. No.: WO2019/012772
PCT Pub. Date: Jan. 17, 2019

(65) Prior Publication Data
US 2020/0195470 A1  Jun. 18, 2020

(30) Foreign Application Priority Data
Jul. 12, 2017  (JP) .............................. JP2017-136317

(51) Int. Cl.
*H04L 12/42* (2006.01)
*H04L 12/427* (2006.01)
*H04L 12/437* (2006.01)

(52) U.S. Cl.
CPC .......... *H04L 12/422* (2013.01); *H04L 12/427* (2013.01); *H04L 12/437* (2013.01); *H04L 2012/421* (2013.01)

(58) Field of Classification Search
CPC ... H04L 12/422; H04L 12/427; H04L 12/437; H04L 2012/421
See application file for complete search history.

(56) References Cited

U.S. PATENT DOCUMENTS 5,347,177 A    9/1994  Lipp
5,995,021 A   11/1999  Kogure
(Continued)

FOREIGN PATENT DOCUMENTS

JP    03-129929 A     6/1991
JP   2000-278295 A   10/2000
(Continued)

OTHER PUBLICATIONS

International Search Report, PCT/JP2018/015794, dated Jul. 3, 2018, 1 pg.

*Primary Examiner* — Rasheed Gidado
(74) *Attorney, Agent, or Firm* — Volpe Koenig

(57) ABSTRACT

A communication device includes a master station, a ring-type transmission line whose start point and end point are connected to the master station, and a plurality of slave stations connected to the ring-type transmission line in parallel. The master station transmits a signal and feeds electric power from both of the start point and the end point of the ring-type transmission line. Each of the slave stations includes an impedance variable element connected to the ring-type transmission line in parallel, and values are set to the impedance variable elements in accordance with the connection positions of the slave stations.

10 Claims, 7 Drawing Sheets

(56) References Cited

U.S. PATENT DOCUMENTS

| | | | | |
|---|---|---|---|---|
| 6,005,869 A | * | 12/1999 | Sakai | H04L 12/6418 |
| | | | | 370/452 |
| 7,460,934 B2 | * | 12/2008 | Yanagida | B60R 16/0315 |
| | | | | 340/538 |
| 7,650,450 B2 | * | 1/2010 | Soriano | G06F 13/4282 |
| | | | | 710/110 |
| 10,176,130 B2 | * | 1/2019 | Ngo | G06F 13/404 |
| 10,558,237 B2 | * | 2/2020 | Zhou | G06F 1/04 |
| 2006/0214667 A1 | | 9/2006 | Mizushima | |

FOREIGN PATENT DOCUMENTS

| | | |
|---|---|---|
| JP | 2006-270660 A | 10/2006 |
| JP | 4572711 B2 | 11/2010 |

* cited by examiner

COMMUNICATION DEVICE AND AUTOMOBILE INCLUDING THE SAME

BACKGROUND

The present invention relates to a communication device using a multi-drop bus, and particularly to a communication device including a ring-type bus (transmission line) that can cope with disconnection of the bus and an automobile including the communication device.

In recent years, along with high accuracy and high functionality of vehicle control by an ECU (Electronic Control Unit), a number of sensors and actuators are beginning to be mounted in automobiles to obtain various pieces of vehicle information including vehicle peripheral information as well as to control each unit of vehicles. Along with this, the number of wirings to electrically connect the sensors and/or actuators (hereinafter, also referred to as sensor actuators) and the ECU has been remarkably increased. An increase in the number of wirings leads to an increase in the manufacturing cost and weight of automobiles, causing a problem of deterioration of fuel efficiency. Thus, it has been required to reduce the number of wirings by integration and abolition of the wirings.

Accordingly, a one-to-N multi-drop serial bus communication in which a communication circuit is provided in a sensor actuator and feeding of a DC voltage for operations and communications for control are collectively performed through a pair of wirings has been defined in the communication standard such as DSI3 and DSI5. In this case, a slave station is configured using the sensor actuator and the communication circuit provided therein, and plural (N) slave stations are connected to the multi-drop serial bus. Communications for control are performed between one master station connected to the bus and the communication circuit of the slave station. In addition, electricity is fed to the slave station through the bus.

One of the pair of wirings is a wiring for supplying, for example, a ground voltage. Thus, the wirings can be integrated into one for a plurality of slave stations in the above-described configuration, and it is possible to eliminate the above-described problem. In addition, the cost required for the wirings can be reduced. However, the importance of one wiring is increased by reducing the number of wirings to one. Thus, there is a new problem that a risk of a disconnection failure of the wiring is increased. In particular, control of a vehicle such as an automobile is related to human life, and high reliability is required. In order to apply the above-described bus communication to such application in which high reliability is required, it is necessary to respond to the disconnection failure of the wiring. For example, it is conceivable that two wirings are simply used for duplexing. The duplexing causes an increase in the number of wirings. Thus, as a technique to realize a low cost by further reducing the number of wirings, a configuration in which the multi-drop serial bus is formed in a ring shape and is connected to a master station is described in Japanese Unexamined Patent Application Publication No. 2000-278295, Japanese Unexamined Patent Application Publication No. 2006-270660, and Japanese Patent No. 4572711.

SUMMARY

With reference to FIG. 1 of Japanese Unexamined Patent Application Publication No. 2000-278295, a master station (1) and a plurality of slave stations (24 to 27) are connected to each other through a loop-type transmission line (28). In a normal state, the master station (1) performs transmission/reception only from one side of the loop-type transmission line (28) using a line switching relay contact point (11) or (12). Accordingly, communication operations are performed as a general line-type bus. When disconnection has occurred in the loop-type transmission line (28), a response of communications with a slave station beyond the disconnection point stops, and thus the master station (1) determines that disconnection has occurred. In a period of occurrence of disconnection, the master station (1) performs transmission/reception from the both sides of the loop-type transmission line (28) using both of the line switching relay contact points (11) and (12). Accordingly, even if disconnection has occurred at one point of the loop-type transmission line, communications can be recovered. In addition, terminators (15, 16, and 22) are connected to the loop transmission line through a terminator connection relay contact point.

Japanese Unexamined Patent Application Publication No. 2000-278295 describes that the terminators (termination resistors) are connected to the loop transmission line in a normal state and in a period of occurrence of disconnection. However, when disconnection occurs, the terminators are cut off from the loop transmission line. Therefore, the occurrence of disconnection causes an open-end state in which no terminators exist in the loop transmission line. In the open-end state in which no terminators exist, a signal is reflected at the disconnection point, and the signal waveform is largely disturbed and deteriorated. Thus, there is a concern of a problem that communications become impossible at the same time when disconnection occurs.

In addition, it takes time from occurrence of disconnection to detection and recovery of the disconnection. Although not described in Japanese Unexamined Patent Application Publication No. 2000-278295, in the case where the technique is applied to an electric power line communication in which a DC voltage is superimposed on a loop transmission line to feed electricity to a slave station, there is time when no electricity is fed to the slave station, and thus it is disadvantageously difficult to apply the technique to the electric power line communication.

As similar to Japanese Unexamined Patent Application Publication No. 2000-278295, Japanese Unexamined Patent Application Publication No. 2006-270660 and Japanese Patent No. 4572711 describe that communication operations are performed as a bus of a line-type topology in a normal state. Japanese Unexamined Patent Application Publication No. 2006-270660 and Japanese Patent No. 4572711 are compatible with the electric power line communication, and disconnection is determined by detecting a decrease in voltage at an end of a transmission line. When disconnection occurs, electricity is fed from both ends of the transmission line. Japanese Unexamined Patent Application Publication No. 2006-270660 and Japanese Patent No. 4572711 describe that a problem related to deterioration of a signal waveform caused due to absence of a termination resistor when disconnection occurs is solved in such a manner that in the case where a terminal block that branches a transmission line to a slave station in a T-shape has detected neighboring disconnection, the terminal block newly inserts a termination resistor, and the termination resistor is secured even at the time of disconnection, to enable communications.

However, Japanese Unexamined Patent Application Publication No. 2006-270660 and Japanese Patent No. 4572711 do not present means by which the terminal block detects disconnection of a neighboring transmission line, and do not show that such a terminal block can be realized. In addition, even if a terminal block including means to detect disconnection can be realized, the cost is disadvantageously increased because such means is provided in all the terminal blocks.

An object of the present invention is to provide a communication device that can suppress disturbance of a signal waveform even when disconnection occurs and can continue communications with a slave station and feeding of electric power to the slave station.

The above-described and other objects and novel features of the present invention will become apparent from the description of the specification and the accompanying drawings.

The following is a summary of the representative outline of the invention disclosed in the application.

A communication device according to one embodiment includes a master station, a ring-type transmission line whose start point and end point are connected to the master station, and a plurality of slave stations connected to the ring-type transmission line in parallel. The master station transmits a signal and feeds electric power from both of the start point and the endpoint of the ring-type transmission line, and each of the slave stations includes an impedance variable element, and the impedance variable elements are connected to the ring-type transmission line in parallel.

In a communication device according to one embodiment, the input impedance of a slave station when viewing the slave station from a connection part in a ring-type transmission line can be changed by an impedance variable element. A master station calculates an impedance value set to the impedance variable element in accordance with the physical connection position of the connection part in the ring-type transmission line, and sets the value to the impedance variable element in the slave station to define the input impedance of the slave station.

The following is a summary of an effect obtained by the representative invention disclosed in the application.

It is possible to provide a communication device that can suppress deterioration of a signal waveform even when disconnection occurs and can continue communications with a slave station and feeding of electric power to the slave station.

Electric power is fed from both of the start point and the end point of the ring-type transmission line. Thus, even when disconnection occurs, electric power can be continuously fed. In addition, the slave station includes the impedance variable element connected to the ring-type transmission line. Thus, even when disconnection occurs, impedance is connected to the transmission line, and it is possible to prevent an open-end state of the transmission line. In addition, it is possible to suppress deterioration of a signal waveform.

In addition, the impedance value set to the impedance variable element is defined in accordance with the connection position of the slave station. Thus, it is possible to set an appropriate value to suppress deterioration of a signal waveform.

DETAILED DESCRIPTION

Hereinafter, embodiments of the present invention will be described in detail on the basis of the drawings. It should be noted that the same parts will be followed by the same signs in principle in all the drawings for explaining the embodiments, and the repeated explanation thereof will be omitted.

A communication device mounted in an automobile will be described below as an example. An automobile is equipped with a plurality of sensor actuators. As will be described later in detail, the communication device includes a master station and a plurality of slave stations. The slave stations are provided with control devices for controlling the sensor actuators, and the control devices in the slave stations control the sensor actuators in accordance with an instruction from the master station. For example, a sensor obtains vehicle information of the automobile under the control. The obtained vehicle information is transmitted from the slave station to the master station, and is processed by the master station. In addition, the actuator executes an operation in accordance with the instruction from the master station under the control.

In the embodiments, a communication device mounted in an automobile will be described as an example. However, the present invention is not limited to this. The communication device may be mounted in, for example, a ship, a train, or the like.

First Embodiment

Figure 1:
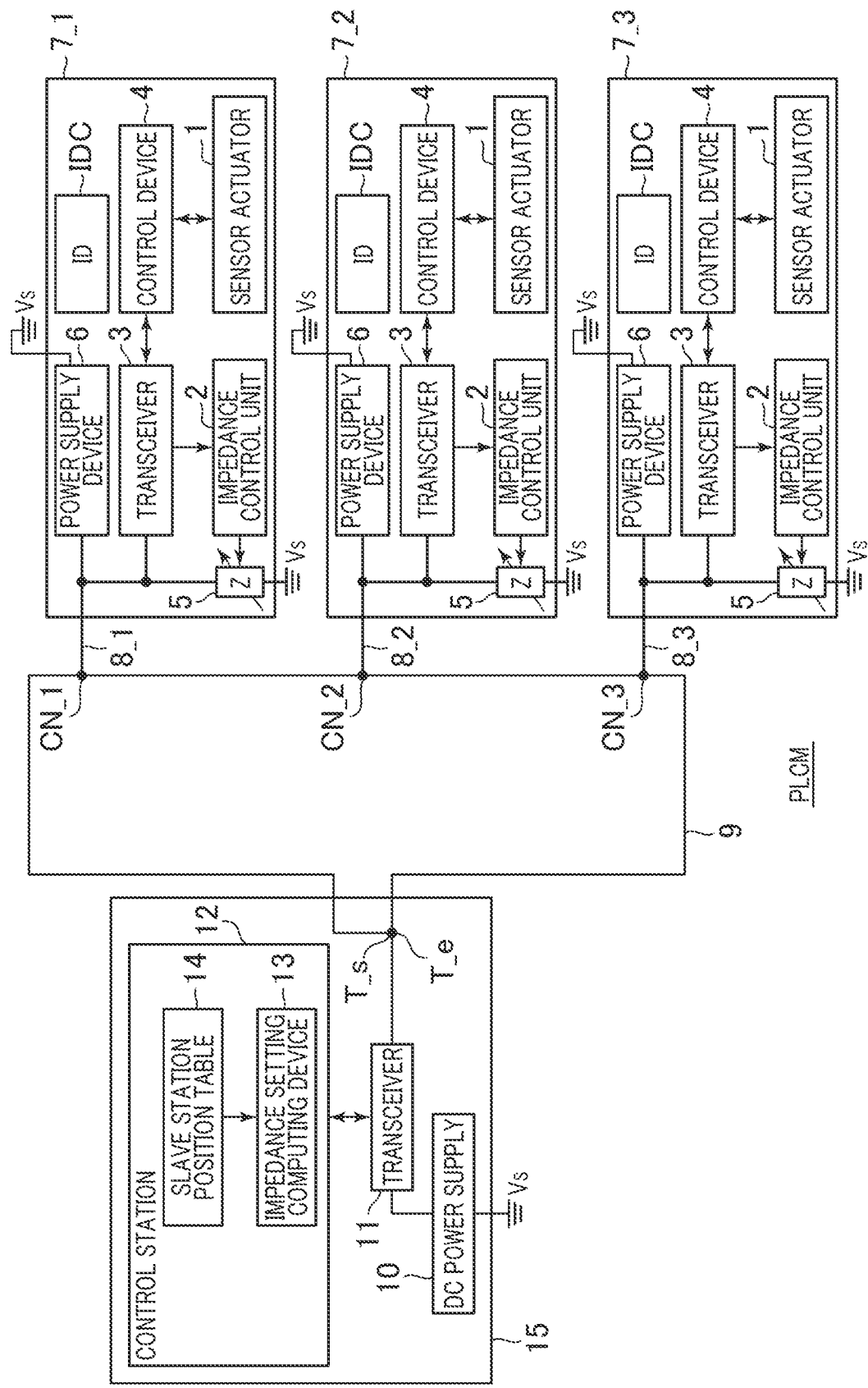
FIG. 1 is a block diagram for showing a configuration of a communication device according to a first embodiment.

FIG. 1 is a block diagram for showing a configuration of a communication device according to a first embodiment. In FIG. 1, PLCM denotes a communication device mounted in an automobile. The communication device PLCM includes one master station 15, a ring-type transmission line (ring-type wired transmission line) 9 configured using a pair of electric wires (wirings), and a plurality (N pieces) of slave stations 7. The master station 15 and the slave stations 7 are connected in parallel with respect to the ring-type transmission line 9. In the drawing, three slave stations 7_1 to 7_3 among N slave stations 7 are representatively shown.

The ring-type transmission line 9 includes a start point T_s and an end point T_e, and the pair of electric wires extends between the start point T_s and the end point T_e. In the first embodiment, the pair of electric wires is configured using a signal electric wire for transmitting a signal and a grounding electric wire for transmitting a ground voltage Vs. In the first embodiment, a chassis of the automobile is used as the grounding electric wire, but the present invention is not limited to this. Therefore, the electric wire configuring the ring-type transmission line 9 shown in FIG. 1 shows the signal electric wire. The signal electric wire extends between the start point T_s and the end point T_e, and electrically connects the start point T_s and the end point T_e to each other. The start point T_s and the end point T_e can be regarded as a pair of ends included in the signal electric wire. The start point T_s and the end point T_e are connected to each other, and the signal electric wire is formed in a ring shape.

The slave stations 7 are connected to connection positions CN in the ring-type transmission line (signal electric wire) 9 through short T-type branch parts 8. When the slave station 7_1 is exemplified, the slave station 7_1 is connected to a connection position CN_1 in the ring-type transmission line 9 through a short T-type branch part 8_1. Likewise, the other slave stations (for example, 7_2 and 7_3) are also connected to corresponding connection positions (CN_2 and CN3) through corresponding short T-type branch parts (8_2 and 8_3).

The start point T_s and the end point T_e of the ring-type transmission line 9 are connected to the master station 15. As will be described later, a signal (data) is transmitted and received between the master station 15 and the N slave stations 7 using the ring-type transmission line 9. Accordingly, the 1 (master station)-to-N (slave stations) communication device PLCM is configured.

<Configuration of Master Station>

The master station 15 includes a DC power supply device (described as "DC power supply" in the drawing) 10, a master station-side transceiver (described as "transceiver" in the drawing) 11, and a control station 12. The DC power supply device 10 forms a DC voltage on the basis of a ground voltage Vs, and applies the same to the start point T_s and the end point T_e of the ring-type transmission line 9. Accordingly, electric power to operate the slave stations 7_1 to 7_3 is fed from the master station 15 to the start point T_s and the end point T_e of the ring-type transmission line 9. In FIG. 1, the DC power supply device 10 is connected to the start point T_s and the endpoint T_e through the master station-side transceiver 11. However, the DC power supply device 10 may be connected to the start point T_s and the end point T_e not through the master station-side transceiver 11.

The master station-side transceiver 11 modulates or demodulates the signal waveform of the current/voltage, and transmits or receives data to/from the slave stations. In the case where data from a host system (not shown) is transmitted to the slave stations, the master station-side transceiver 11 modulates data to be transmitted, and supplies the signal waveform of the modulated current/voltage to both of the start point T_s and the end point T_e of the ring-type transmission line 9. In the case where data from the slave stations is received, the master station-side transceiver 11 demodulates the signal waveform of the current/voltage at the start point T_s and the end point T_e of the ring-type transmission line 9, and supplies data obtained by the demodulation to the host system.

The control station 12 is a unit for controlling the slave stations 7_1 to 7_3. The control station 12 includes a slave station position table 14 in which connection position information related to the physical connection positions CN_1 to CN_3 of the slave stations 7_1 to 7_3 on the ring-type transmission line 9 is described and an impedance setting computing device 13 that calculates impedance values to be set to the slave stations 7_1 to 7_3 by computation on the basis of the connection position information described in the slave station position table 14. The impedance values calculated by the control station 12 are supplied to the master station-side transceiver 11. As similar to the case in which data is supplied from the host system, the master station-side transceiver 11 modulates the supplied impedance value as data to be transmitted, and supplies the signal waveform of the modulated current/voltage to both of the start point T_s and the end point T_e of the ring-type transmission line 9.

<Configuration of Slave Station>

The slave stations 7_1 to 7_3 have the same configuration, and thus the slave station 7_1 will be described as an example. The slave station 7_1 includes an impedance control unit 2, a slave station-side transceiver 3, a control device 4, an impedance variable element 5, a power supply device 6, and an ID holding circuit IDC. In the first embodiment, the slave station 7_1 further includes a sensor actuator 1, but the present invention is not limited to this. Since the sensor actuator 1 to be controlled by the slave station 7_1 is included in the automobile, it may be understood that the sensor actuator 1 is arranged not inside the slave station 7_1 but outside the slave station 7_1.

In the slave station 7_1, the slave station-side transceiver 3, the impedance variable element 5, and the power supply device 6 are connected to the connection position CN_1 of the ring-type transmission line 9 through the short T-type branch part 8_1. Here, the power supply device 6 and the impedance variable element 5 are connected in parallel between the ground voltage Vs and the T-type branch part 8_1. A DC voltage is fed from the ring-type transmission line 9 to the power supply device 6 through the T-type branch part 8_1, and the power supply device 6 forms a DC power supply voltage necessary to operate the slave station 7_1 including the power supply device 6 from the DC voltage.

As similar to the master station-side transceiver 11, the slave station-side transceiver 3 modulates or demodulates the signal waveform of the current/voltage, and transmits or receives data to/from the master station. In the case where data is transmitted to the master station 15, the slave station-side transceiver 3 modulates data to be transmitted, and supplies the signal waveform of the modulated current/voltage to the connection position CN_1 of the ring-type transmission line 9 through the T-type branch part 8_1. On the other hand, in the case where data is received from the master station 15, the slave station-side transceiver 3 demodulates the signal waveform of the current/voltage at the connection position CN_1 of the ring-type transmission line 9 through the T-type branch part 8_1, and uses data obtained by the demodulation as reception data.

The control device 4 is connected to the slave station-side transceiver 3 and the sensor actuator 1. The control device 4 receives the reception data received by the slave station-side transceiver 3, and controls the sensor actuator 1 in accordance with the reception data. Accordingly, the sensor actuator 1 operates in accordance with an instruction (command) from the master station 15. In addition, a signal from the sensor actuator 1, for example, data from the sensor is supplied to the slave station-side transceiver 3 by the control device 4. The slave station-side transceiver 3 modulates the supplied data in the same manner as descried above, and transmits the modulated data to the master station 15.

The impedance control unit 2 is connected to the slave station-side transceiver 3 and the impedance variable element 5. In the case where the slave station-side transceiver 3 receives an impedance value from the master station 15 through the ring-type transmission line 9 and the T-type branch part 8_1, the slave station-side transceiver 3 supplies the received impedance value to the impedance control unit 2. The impedance control unit 2 controls the impedance value of the impedance variable element 5 on the basis of the supplied impedance value, and sets a value in accordance with the supplied impedance value.

The impedance when viewing the slave station 7_1 side form the connection position CN_1, namely, the input impedance (hereinafter, also simply referred to as the impedance of the slave station) of the slave station 7_1 is set by combining the impedance of the impedance variable element 5, the input impedance of the slave station-side transceiver 3, the input impedance of the power supply device 6, and the like. In the slave station 7_1 according to the first embodiment, the input impedance of the slave station 7_1 is controlled to be a desired value by setting the impedance of the impedance variable element 5 in accordance with the impedance value received from the master station 15. That is, the impedance of the slave station 7_1 is set on the basis of an instruction from the master station 15.

As described above, since the impedance variable element 5 and the power supply device 6 are connected in parallel, the input impedance of the power supply device 6 is desirably high in order to widen the variable range of the input impedance of the slave station 7_1. In order to set the input impedance of the power supply device 6 high, an input unit thereof is configured using a low-pass filter, a current source, or the like, and the input impedance (the input impedance of the power supply device 6) when viewing the input unit of the power supply device 6 from the connection position CN_1 is set to be high in the frequency band of the signal waveform of transmitted and received data. That is, the input impedance is desirably high in the frequency band of the signal waveform.

As described above, the sensor actuator 1 may be arranged outside the slave station 7_1. Further, it is not necessary for the slave station 7_1 to be directly connected to the sensor actuator 1 to be controlled. For example, the slave station 7_1 may be a relay device that transmits and receives data to/from a device (not shown) without being directly connected to the sensor actuator 1.

The impedance variable element 5 is desirably configured to be capable of accurately setting the impedance thereof in accordance with the impedance value from the master station 15. In the first embodiment, the impedance variable element 5 is configured using an array including a plurality of unit impedance elements having predetermined unit impedance and a plurality of switch elements, but the present invention is not limited to this. The impedance value from the master station 15 is converted into a digital signal by the impedance control unit 2, but the present invention is not limited to this. On/off of the switch elements is controlled on the basis of the digital signal obtained by the conversion. The unit impedance elements are connected in series or in parallel on the basis of on/off of the switch elements. The unit impedance elements the number of which is designated by the digital signal are connected, for example, in series by the switch elements. Accordingly, the impedance value of the impedance variable element 5 can be set on the basis of the number of unit impedance elements connected in series. An example of the impedance variable element 5 configured in an array system has been described, but the present invention is not obviously limited to this.

In the first embodiment, the impedance value set for the impedance variable element 5 is obtained by scaling the characteristic impedance (Z0) of the ring-type transmission line 9. That is, by using the characteristic impedance (Z0) as a reference value, the impedance value of the impedance variable element 5 is set in accordance with a ratio to the reference value. For example, when the value of the characteristic impedance is 1, a value (including 1) that is a multiple of an integer or a value obtained by dividing 1 by an integer is set as the impedance of the impedance variable element 5.

Therefore, the same value as the characteristic impedance (Z0) is used for the unit impedance of the unit impedance elements included in the impedance variable element 5, but the present invention is not limited to this. That is, as the unit impedance elements, resistive elements having the same value as the characteristic impedance (Z0) are used. The resistive elements are connected in series or in parallel through the switch elements, so that the impedance value of the impedance variable element 5 can be set according to a ratio on the basis of the characteristic impedance.

In the first embodiment, as will be described later using FIG. 2 and the like, the impedance value of the impedance variable element 5 is changed in accordance with the connection position of the slave station 7_1. The impedance initial value (initial defined value) of the impedance variable element 5 before changed is set so that a ratio to the characteristic impedance of the ring-type transmission line 9 is 1. That is, the impedance initial value of the impedance variable element 5 is the same as the characteristic impedance (Z0) of the ring-type transmission line 9. Accordingly, the value of the input impedance of the slave station 7_1 is the same as the characteristic impedance of the ring-type transmission line 9.

Since a voltage is fed to the ring-type transmission line 9 from the master station 15, the fed DC voltage is superimposed to the ring-type transmission line 9. A current flows between the ring-type transmission line 9 and the ground voltage Vs through the impedance variable element 5, and thus it is conceivable that power consumption is increased. In order to reduce unnecessary power consumption, a DC-cut capacitive element is desirably connected in series to the impedance variable element 5.

The ID holding circuit IDC is a holding circuit in which identification information ID for identifying the slave station 7_1 is set. The identification information ID set in the ID holding circuit IDC differs depending on the slave station. In the case where the master station 15 transmits data to the slave station 7_1, for example, the master station 15 transmits the transmission data to the ring-type transmission line 9 by adding the identification information ID of the slave station 7_1 to the data. The slave station 7_1 determines the identification information ID added to the transmission data in the ring-type transmission line 9. In the case where the identification information ID is for identifying the slave station 7_1, the slave station 7_1 receives the transmission data. In the case where the identification information ID is not for identifying the slave station 7_1, the slave station 7_1 ignores the transmission data. In addition, in the case where the slave station 7_1 transmits data to the ring-type transmission line 9, the slave station 7_1 transmits the data to be transmitted to the ring-type transmission line 9 by adding the identification information ID set in the ID holding circuit IDC to the data. The master station 15 recognizes that the transmission data was transmitted from the slave station 7_1 on the basis of the identification information ID of the transmission data in the ring-type transmission line 9.

The slave station 7_1 has been described as an example. However, the other slave stations (7_2, 7_3, and the like) are the same.

<Operation of Input Impedance Setting of Slave Station>

Next, an operation of setting the input impedance of the slave stations 7_1 to 7_3 will be described. The master station 15 supplies an impedance value to the slave station through the ring-type transmission line 9, the impedance variable element 5 of the slave station is set in accordance with the supplied impedance value, and then the input impedance of the slave station is set.

Figure 2:
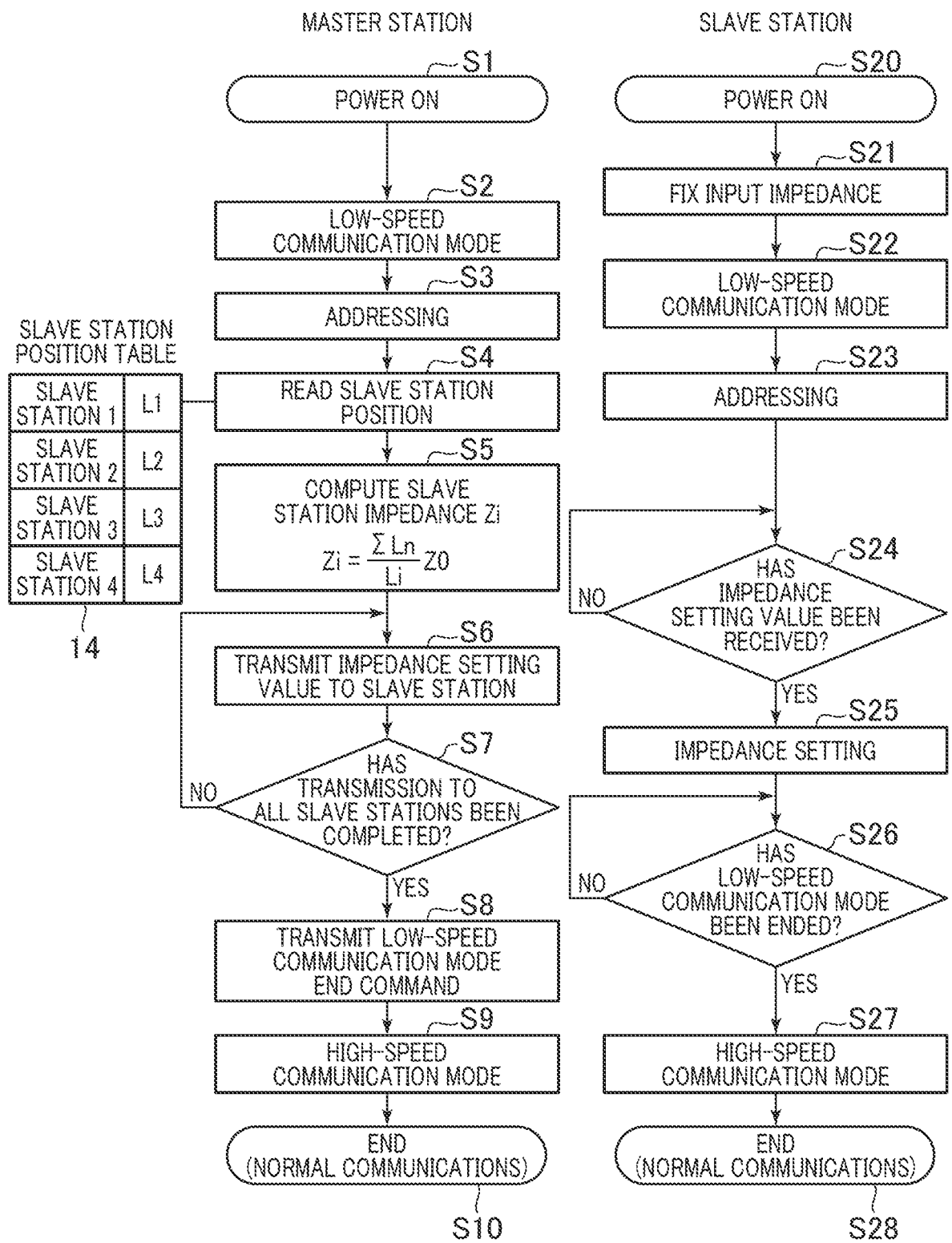
FIG. 2 is a flowchart for showing an operation of the communication device according to the first embodiment.

FIG. 2 is a flowchart for showing an operation of the communication device PLCM according to the first embodiment. Although various operations are performed in the communication device PLCM, only an operation of setting the input impedance of the slave station is illustrated. In FIG. 2, the flow illustrated on the left side is a flow related to the master station 15, and the flow illustrated on the right side is a flow related to the slave station 7. Hereinafter, an operation of setting the input impedance of the slave station will be described with reference to FIG. 1 and FIG. 2.

The power supply of the master station 15 is put in an ON state in the communication device PLCM in Step S1. When the power supply of the master station 15 is put in an ON state, the DC power supply device 10 in the master station 15 forms a DC voltage, and the DC power supply device 10 is connected to the ring-type transmission line 9. Accordingly, the DC voltage formed by the DC power supply device 10 is fed to both of the start point T_s and the end point T_e of the ring-type transmission line 9. The DC voltage fed to the ring-type transmission line 9 is supplied to the power supply device 6 of each of the slave stations 7_1 to 7_3. Each of the power supply devices 6 forms a DC voltage to operate the slave station, and each of the slave stations 7_1 to 7_3 is turned on and activated in Step S20.

In each of the slave stations 7_1 to 7_3 after activation, the impedance control unit 2 sets the value of the impedance variable element 5 to the initial value in Step S21. As described above, the initial value of the impedance variable element 5 is the same as the characteristic impedance (Z0) of the ring-type transmission line 9. Thus, the input impedance of the slave stations 7_1 to 7_3 can be set (the input impedance can be fixed) by setting the value of the impedance variable element 5. That is, it is possible to prevent the ring-type transmission line 9 from being put in an open-end state in which an end resistor (terminator) is not connected. In this case, when data is transferred at a high speed between the master station 15 and the slave stations 7_1 to 7_3, there is a possibility that the communication signal waveform is largely disturbed by a reflection wave generated due to mismatch of the impedance. In the first embodiment, data is temporarily transmitted and received at a low speed between the master station 15 and the slave stations 7_1 to 7_3 until the input impedance of the slave stations 7_1 to 7_3 is set to a more proper value. It is possible to reduce the influence caused by the disturbance of the communication signal waveform due to the reflection wave by transferring data at a low speed (low data transfer rate) between the master station and the slave station. As a result, it is possible to certainly secure data transmission and reception (communications) between the master station 15 and the slave stations 7_1 to 7_3 although the speed is low.

In order to perform communications at a low speed between the master station 15 and the slave stations 7_1 to 7_3, a low-speed communication mode is set in the master station 15 in Step S2, and the low-speed communication mode is set in the slave stations 7_1 to 7_3 in Step S22. The low-speed communication mode is set so that both of the master station-side transceiver 11 and the slave station-side transceiver 3 are set to transmit and receive data at a low data transfer rate.

Next, the slave stations 7_1 to 7_3 are recognized by the master station 15 in Steps S3 and S23. In addressing in Step S3, simultaneous multiple addressing (broadcast) to the slave stations is performed by the master station 15. In response to this, the slave stations 7_1 to 7_3 transmit the identification information ID set in the ID holding circuit IDC to the master station 15 in addressing in Step S23. In Step S3, the master station 15 collects the identification information ID from the slave stations 7_1 to 7_3. Accordingly, the master station 15 obtains a list of the slave stations 7_1 to 7_3 connected to the ring-type transmission line 9.

When the master station 15 obtains the list of the slave stations 7_1 to 7_3, the master station 15 accesses the slave station position table 14. In FIG. 2, an example of the slave station position table 14 is shown. In the first embodiment, the slave stations and connection position information of the slave stations are preliminarily described in the slave station position table 14. In the slave station position table 14 shown in FIG. 2, slave stations 1 to 4 and connection position information L1 to L4 are described. Here, the slave stations 1 to 4 are represented by the identification information ID. In addition, the connection position information is information related to physical connection positions where the slave stations are connected in the ring-type transmission line 9. The master station 15 searches the slave station position table 14 for the slave station corresponding to the obtained identification information ID, and obtains the connection position information corresponding to the retrieved slave station. Accordingly, the master station 15 obtains the connection position information related to the connection position where each of the slave stations 7_1 to 7_3 recognized to be connected to the ring-type transmission line 9 is physically connected in the ring-type transmission line 9 (Step S4: reading of slave station position).

In Step S5, the master station 15 allows the impedance setting computing device 13 to compute an impedance value to be set for the impedance variable element 5 of each of the slave stations 7_1 to 7_3 using the obtained connection position information of the slave stations 7_1 to 7_3. "Computation of slave station impedance Zi" executed in Step S5 is not described here, but will be described later using FIG. 3.

In the first embodiment, the host system (including a high-order application layer) of the communication device PLCM recognizes the slave stations connected to the ring-type transmission line 9, the number of slave stations, and each connection position information, and these pieces of information are given to the slave station position table 14 as configuration values and described in the slave station position table 14. In the case where the connection position of the slave station or the like is unknown, the connection position information of the slave station in the ring-type transmission line 9 can be obtained using a communication device according to a third embodiment to be described later.

After computing the impedance value for each slave station in Step S5, the master station 15 transmits the impedance value obtained by the computation as an impedance setting value for the slave station in Step S6. That is, the master station 15 transmits the impedance value according to the connection position of the slave station in Step S6. Thereafter, in Step S7, the master station 15 determines whether or not the transmission of the impedance setting values to all the slave stations shown in the list of the slave stations obtained in the addressing in Step S3 has been completed. In the case where the transmission has not been completed (No), Step S6 is repeatedly executed until the transmission is completed.

When the transmission of the impedance setting values to all the slave stations has been completed, the master station 15 executes Step S8. In Step S8, the master station 15 transmits an end command (low-speed communication mode end command) notifying the end of the low-speed communication mode to all the slave stations using the master station-side transceiver 11. Thereafter, the master station 15 is shifted to a high-speed communication mode in Step S9. In Step S9, for example, the master station-side transceiver 11 is set to a high-speed data transfer rate. The master station 15 ends (END) the operation of the input impedance setting of the slave stations in Step S10, and starts normal communications with the slave stations. It should be noted that data is transmitted and received between the master station 15 and the slave stations in the high-speed communication mode in the normal communications.

On the other hand, after executing Step S23, the slave station executes Step S24. In Step S24, it is determined whether or not the impedance setting value has been received from the master station 15. The master station 15 transmits the impedance setting values in the order of, for example, the slave stations 7_1, 7_2, and 7_3 by executing Step S6 and S7. In this case, the slave station 7_3 repeats Step S24 until the master station 15 transmits the impedance setting value to the slave station 7_3 and the slave station 7_3 receives the same.

When receiving the impedance setting value, each of the slave stations 7_1 to 7_3 executes Step S25. In Step S25, the received impedance setting value is supplied from the slave station-side transceiver 3 to the impedance control unit 2, and the impedance control unit 2 sets the value of the impedance variable element 5 to a value in accordance with the impedance setting value.

The slave station that has completed the setting of the received impedance setting value to the impedance variable element 5 executes Step S26. In Step S26, it is determined whether or not the low-speed communication mode end command has been received from the master station 15. The slave station executes Step S26 until the low-speed communication mode end command is received. When receiving the command, the slave station executes Step S27. In Step S27, the slave station is shifted from the low-speed communication mode to the high-speed communication mode. For example, the slave station-side transceiver 3 is set to transmit and receive data at a high-speed data transfer rate. In Step S28 after being shifted to the high-speed communication mode, the slave station ends (END) the operation of the input impedance setting, and starts normal communications with the slave stations 15.

<Computation of Slave Station Impedance Zi>

In Step S5, a computation to obtain the impedance setting value so as to set the input impedance of the slave station to be a more proper value is executed. As described earlier, the value of the impedance variable element 5 in the slave station is changed from the initial value to a value in accordance with the impedance setting value obtained in Step S5. In the first embodiment, a value set to the impedance variable element 5 differs in accordance with the connection position information of the slave station.

In the ring-type transmission line 9, the slave station (7_2) is connected to the connection position (for example, CN_2 of FIG. 1). In this case, an equivalent conductance element (in other words, an equivalent impedance element of a value corresponding to the input impedance of the slave station) formed by the slave station 7_2 can be regarded as being connected between the connection position CN_2 and the ground voltage Vs. Inter-line (between the signal electric wire and the grounding electric wire) conductance is generated by the equivalent conductance element between the ring-type transmission line 9 and the ground voltage Vs. The slave stations are connected to the physical connection positions that are different from each other in the ring-type transmission line 9, and thus the equivalent conductance element is connected to each connection position. That is, a T-shape conductance element is formed at each connection position.

In the first embodiment, the input impedance of the slave station is set by the impedance variable element so that the inter-line conductance becomes constant on average in the ring-type transmission line 9 to which the slave stations are connected. That is, the value of the impedance variable element is set so that the value of the input impedance of the slave station differs in accordance with the positional density where the slave stations are connected in the ring-type transmission line 9. For example, a case in which the number of slave stations connected to an area having a predetermined physical length in the ring-type transmission line 9 is larger than a predetermined number is regarded as a dense area, and a case in which the number of slave stations is smaller than the predetermined number is regarded as a coarse area. In this case, the value of the impedance variable element is set so that the input impedance of the slave station connected to the dense area becomes relatively high, and the value of the impedance variable element is set so that the input impedance of the slave station connected to the coarse area becomes lower than that of the slave station connected to the dense area.

Accordingly, the slave stations the number of which is larger than the predetermined value and which have relatively-high input impedance are connected in parallel between the ring-type transmission line 9 and the ground voltage Vs in the dense area. On the other hand, the slave stations the number of which is smaller than the predetermined value and which have low input impedance are connected in parallel between the ring-type transmission line 9 and the ground voltage Vs in the coarse area. Accordingly, it is possible to reduce a difference between the combined input impedance connected between the ring-type transmission line 9 and the ground voltage Vs in the dense area and the combined input impedance connected between the ring-type transmission line 9 and the ground voltage Vs in the coarse area. In other words, the inter-line conductance can be closer to constant in the dense area and the coarse area. As described above, it is possible to prevent the quality of the communication signal waveform from largely fluctuating depending on the number of connected slave stations and the connection position pattern (density) by setting the inter-line conductance constant on average in the ring-type transmission line 9, and it is possible to provide transmission lines having stable electric characteristics.

In Step S5 of FIG. 2, an equation to calculate the slave station impedance Zi is shown. Next, the embodiment will be concretely described on the basis of the equation. It is obvious that the equation is an example, and the present invention is not limited to this.

Figure 3:
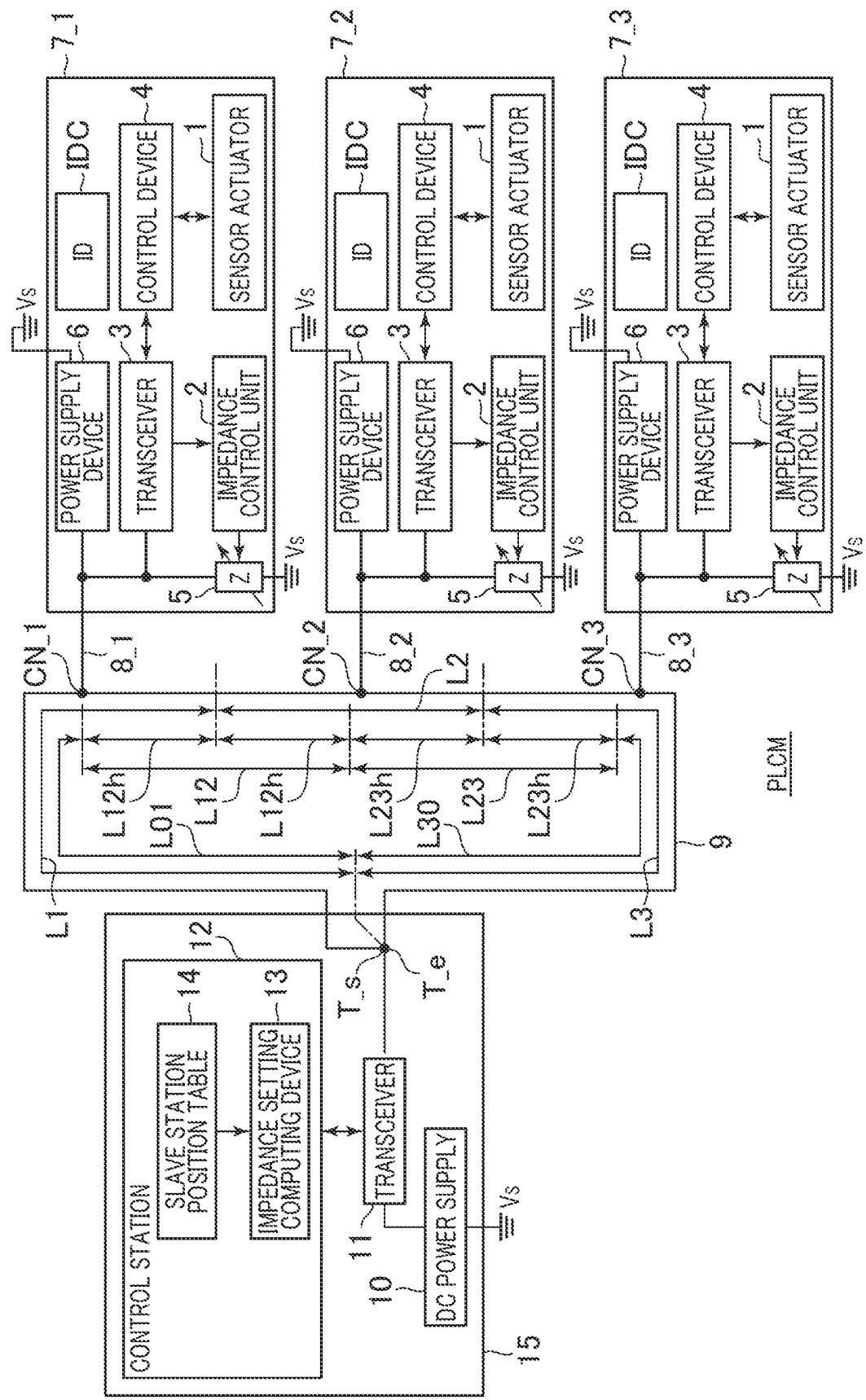
FIG. 3 is a block diagram for explaining the communication device according to the first embodiment.

FIG. 3 is a block diagram for explaining the communication device according to the first embodiment. FIG. 3 is similar to FIG. 1, but is different from FIG. 1 in that signs and the like to explain the computation of the slave station impedance Zi are given. The configuration of the communication device PLCM is the same as that in FIG. 1, and thus the explanation thereof will be omitted.

In FIG. 3, the slave station 7_1 connected to the position (connection position CN_1) nearest to the start point T_s of the ring-type transmission line 9 is regarded as a first slave station. Hereinafter, the numbers given to the slave stations are increased in the order of the slave stations connected to the positions towards the end point T_e. That is, the slave station 7_2 connected to the position (CN_2) nearer to the end point T_e than the slave station 7_1 is regarded as a second slave station, and the slave station 7_3 (connection position CN_3) is regarded as a third slave station.

In the equation, connection position information Li represents a physical interval between an i-th slave station and slave stations arranged at positions sandwiching the i-th slave station. That is, the connection position information Li represents the sum of an interval between the i-th slave station and an (i+1)-th slave station and an interval between the i-th slave station and an (i−1)-th slave station. In the first embodiment, a half value (½) of a physical distance between the i-th slave station and the (i+1)-th slave station is used as an interval between the i-th slave station and the (i+1)-th slave station. Likewise, a half value (½) of a physical distance between the i-th slave station and the (i−1)-th slave station is used as an interval between the i-th slave station and the (i−1)-th slave station. The sum of the two intervals corresponds to the value of the connection position information Li. In addition, in the case where a target slave station is connected between another slave station and the master station 15, an interval between the target slave station and the adjacent slave station is set as a half value of a distance between the target slave station and the adjacent slave station, and as an interval between the target slave station and the master station 15, a distance between the target slave station and the master station 15 is used as it is. That is, the connection position information Li of the target slave station corresponds to the sum of a half value of a distance between the slave stations and a distance between the slave station and the master station 15.

The connection position information Li will be described using FIG. 3 as an example. The second slave station 7_2 is sandwiched between the first slave station 7_1 and the third slave station 7_3. A distance between the connection position CN_1 of the first slave station 7_1 and the connection position CN_2 of the second slave station 7_2 corresponds to L12. Likewise, a distance between the connection position CN_2 of the second slave station 7_2 and the connection position CN_3 of the third slave station 7_3 corresponds to L23. The connection position information L2 of the second slave station 7_2 corresponds to the sum of a half value L12$h$ of the distance L12 and a half value L23$h$ of the distance L23.

On the other hand, the first slave station 7_1 is sandwiched between the master station 15 and the second slave station 7_2. A distance between the start point T_s of the master station 15 and the connection position CN_1 of the first slave station 7_1 corresponds to L01. Therefore, the connection position information L1 of the first slave station 7_1 corresponds to the sum of the distance L01 and the distance L12$h$. Likewise, the connection position information L3 of the third slave station 7_3 corresponds to the sum of a distance L30 between the end point T_e of the master station 15 and the connection position CN_3 of the third slave station 7_3 and the distance L23$h$.

As described above, the connection position information Li of the slave station indicates a value in accordance with the connection position of a slave station i. In addition, the connection position information Li can be also regarded as indicating an interval between the slave stations and an interval between the slave station and the master station. Further, the connection position information Li can be regarded as indicating the density (dense/coarse) of the slave stations connected in the ring-type transmission line 9.

The input impedance Zi of the i-th slave station is obtained in such a manner that the characteristic impedance Z0 of the ring-type transmission line 9 is multiplied by the total length ($\Sigma$Ln) of the ring-type transmission line 9 and the product is divided by the connection position information Li of the i-th slave station. As described above, the input impedance Zi calculated using the connection position information on the basis of the connection position of the slave station is transmitted to the slave station, and the impedance of the slave station is set. That is, the value of the impedance variable element 5 of the i-th slave station is set to correspond to the calculated input impedance Zi. Accordingly, the conductance of the ring-type transmission line 9 becomes constant per length. That is, the conductance of the ring-type transmission line 9 in a state where the slave stations are connected becomes constant per unit length. In addition, the parallel sum of the input impedance of the slave stations connected to the ring-type transmission line 9 corresponds to the characteristic impedance Z0 of the ring-type transmission line 9. It should be noted that Ln represents the connection position information of an n-th slave station in the equation, and the connection position information is handled as an interval between the slave stations or between the slave station and the master station. Therefore, the physical length from the start point T_s to the end point T_e of the master station 15 is obtained by obtaining the total sum based on "$\Sigma$".

Next, the following is a reason that even if disconnection occurs in the ring-type transmission line 9, the disturbance of the communication signal waveform can be suppressed by setting the value of the impedance variable element 5 so that the input impedance of each slave station corresponds to the calculated input impedance Zi.

Figure 4A:
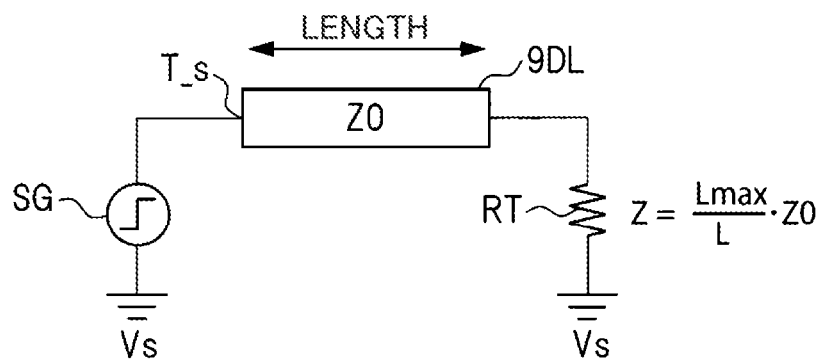
FIGS. 4A to 4C are diagrams for explaining the communication device according to the first embodiment.
Figure 4B:
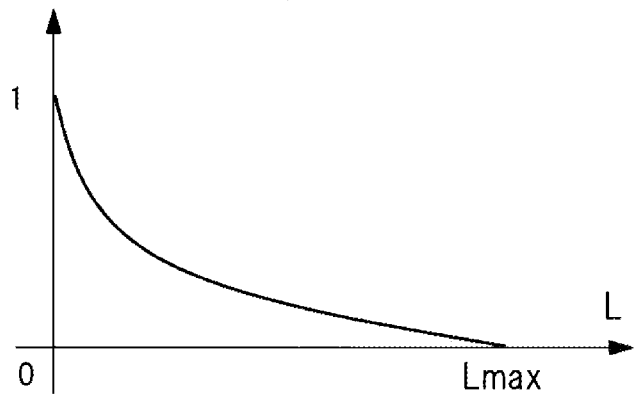
Figure 4C:
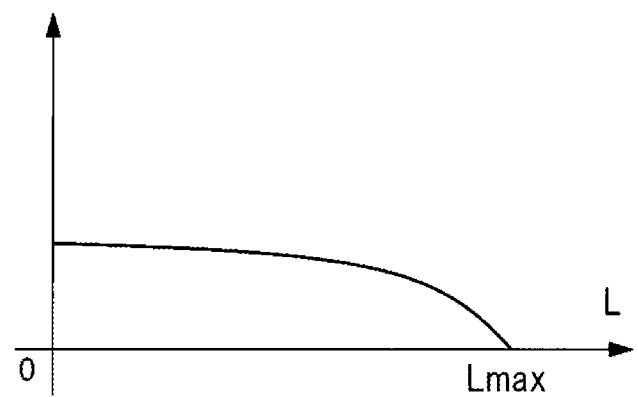

FIGS. 4A to 4C are diagrams each explaining the communication device according to the first embodiment. FIG. 4A is a schematic diagram for schematically showing the ring-type transmission line 9 in the case where disconnection has occurred in the ring-type transmission line 9. FIG. 4B is a diagram for showing a relation between the length (L) of the transmission line and the absolute value of a reflection coefficient $\Gamma$. The horizontal axis represents the length of the transmission line, and the vertical axis represents the absolute value $|\Gamma|$ of the reflection coefficient. In addition, FIG. 4C is a diagram for showing a relation between the length (L) of the transmission line and the convergence time (T) of the communication signal waveform. The horizontal axis represents the length of the transmission line, and the vertical axis represents the convergence time.

In the case where disconnection has occurred in the ring-type transmission line 9, the ring-type transmission line 9 forms not a ring-like but a linear (line-type) transmission line. FIG. 4A shows the linear ring-type transmission line when disconnection has occurred. Here, in the ring-type transmission line 9 divided by disconnection, the transmission line extending from the start point T_s is represented by a sign 9DL. When data is transmitted from the master station 15 to the slave station, a communication signal is supplied from the master station 15 to the start point T_s. In FIG. 4A, the master station 15 is represented as an equivalent communication signal generation source SG.

When disconnection occurs, the slave station is connected to the transmission line 9DL, and the parallel sum of the input impedance of the remaining slave stations is obtained by the above-described equation in such a manner that the approximate characteristic impedance Z0 is multiplied by the total length Lmax (=$\Sigma$Ln) of the ring-type transmission line 9 and the product is divided by the length (L) of the transmission line 9DL remaining due to disconnection. The impedance of the parallel sum is simply represented as an end of the transmission line 9DL, namely, a termination resistor RT connected to the disconnection part of the transmission line as shown in FIG. 4A. The impedance value Z of the termination resistor RT is represented as (Lmax× Z0/L).

The reflection coefficient Γ of FIG. 4B represents a reflection coefficient when viewing the transmission line 9DL from the start point T_s that is the left end of the transmission line 9DL. A reflection coefficient Γ of 0 represents a match without reflection, and 1 and −1 (absolute value 1) represent total reflection. The reflection coefficient Γ is characterized so as to be closer to 0 as the length L of the transmission line 9DL becomes longer to approximate the total length Lmax of the ring-type transmission line 9.

On the other hand, the convergence time T which affects bit errors in communications and at which the disturbance of the communication signal waveform due to the impedance mismatch converges is proportional to a value (=L/ln|Γ|) obtained by dividing the length L of the transmission line 9DL by the reflection coefficient (absolute value |Γ|) of the logarithmic representation (ln), and is changed as shown in FIG. 4C. That is, the convergence time T is characterized to be almost flat even if the length L of the transmission line 9DL is changed from 0 to the total length Lmax.

Thus, in the case where the disconnection part where disconnection has occurred is physically separated from the master station 15 (the start point T_s or the end point T_e), the reflection coefficient becomes small, and the disturbance of the communication signal waveform due to the impedance mismatch can be reduced. In addition, in the case where the disconnection part is closer to the master station 15, the disturbance of the communication signal waveform becomes large, but the convergence time T at which the disturbance converges can be relatively shortened. Accordingly, it is possible to reduce bit errors irrespective of the position of the disconnection part where disconnection has occurred in the ring-type transmission line 9.

In the first embodiment, a DC voltage is fed from the both ends (the start point T_s and the end point T_e) of the ring-type transmission line 9. The output impedance of the DC power supply 10 included in the master station 15 is low to feed electric power to the ring-type transmission line 9. That is, the output impedance of the master station 15 when viewing the master station 15 from the ring-type transmission line 9 is low. On the other hand, in the case where the termination resistor is connected to the ring-type transmission line 9, the termination resistor is connected to the T-shape. That is, the termination resistor is connected in series between the ring-type transmission line 9 and the ground voltage Vs. It is difficult to completely match the impedance between the master station 15 and the slave station even if the impedance of the termination resistor is set to any value because the output impedance of the master station 15 is low. In addition, the degradation (deterioration) of the quality of the communication signal waveform caused by signal reflection due to the impedance mismatch is inevitable.

In the first embodiment, as described in Step S5 of FIG. 2, when no disconnection has occurred, the parallel combined impedance of the input impedance of the slave stations connected to the ring-type transmission line 9 is set to be equal to the characteristic impedance Z0 of the ring-type transmission line 9. Accordingly, in the case where no disconnection has occurred, the impedance mismatch can be reduced as compared to a case in which the termination resistor is not connected to the ring-type transmission line 9, and the quality of the communication signal waveform can be improved.

In addition, the value of the input impedance of the slave station is set by the impedance variable element 5 in accordance with the connection position of the slave station so that the conductance of the ring-type transmission line 9 becomes substantially constant per unit length in a state where the slave stations are connected. Accordingly, even when disconnection has occurred, the impedance variable element of the slave station is connected to the transmission line, and it is possible to realize a state in which the minimal termination resistor is connected. That is, when disconnection has occurred, it is possible to prevent the transmission line from being in an open end state.

In addition, in the case where the disconnection part is physically separated from the start point T_s (or the endpoint T_e), the conductance from the start point T_s to the disconnection part becomes small. In addition, as described in FIGS. 4A to 4C, the value of the termination resistor equivalently connected to the disconnection part can be increased, and the reflection wave can be suppressed. That is, as the disconnection part is physically separated from the start point T_s, the disturbance of the communication signal waveform becomes larger. However, in the first embodiment, as the disconnection part is physically separated from the start point T_s, the value of the equivalent termination resistor can be increased. In addition, it is possible to realize better impedance matching, and the quality of the communication signal waveform can be improved.

On the other hand, in the case where the disconnection part is close to the start point T_s (or the endpoint T_e), a relatively-large reflection wave is generated. However, since the conductance is large, it is possible to shorten time required to converge the reflection wave. Accordingly, it is possible to reduce bit errors.

Further, a DC voltage is fed from the both ends (the start point T_s and the endpoint T_e) of the ring-type transmission line 9. Thus, even if disconnection has occurred at one point of the wiring (electric wire) configuring the ring-type transmission line 9, electric power can be continuously fed to the slave station without controlling an operation of changing the connection of the wirings by the master station 15. In addition, there is no possibility that the operation of the slave station stops at the time of disconnection, and thus reliability can be improved.

As a result, it is possible to provide a communication device that can normally perform communications while continuously feeding electric power without being interrupted even if disconnection has occurred.

It should be noted that an example of the value of the impedance variable element 5 will be described, but the present invention is not particularly limited to the example. Here, a case in which the value of the impedance variable element 5 is substantially equal to the value of the input impedance of the slave station will be described. The value of the impedance variable element 5 is set so that the initial value of the input impedance of the slave station becomes the same as the characteristic impedance Z0 of the ring-type transmission line 9. In this case, the impedance variable element 5 is set to, for example, 100Ω to 120Ω same as the characteristic impedance Z0. In addition, in the case where 7 to 8 slave stations are connected to the ring-type transmission line 9, each impedance variable elements 5 is set to, for example, 400Ω to 500Ω by the impedance setting value from the master station 15. It is obvious that the impedance setting values set to the 7 to 8 slave stations differ depending on the connection positions of the slave stations.

Since the master station 15 transmits data from both of the start point T_s and the end point T_e of the ring-type transmission line 9, the point positioned farthest from the master station 15 can be regarded as the midpoint (the midpoint between the start point T_s and the endpoint T_e) of the ring-type transmission line 9. In this case, the initial value of the impedance variable element 5 is desirably set to a half value of the characteristic impedance Z0. In this case, the parallel combined impedance of the input impedance of the slave stations is desirably set to a half value of the characteristic impedance Z0 by the impedance setting of the master station 15.

A case in which the impedance of the impedance variable element 5 corresponds to the input impedance of the slave station has been described. However, in the case where the input impedance of the power supply device 6 and the input impedance of the slave station-side transceiver 3 have an influence on the input impedance of the slave station, it is only necessary to set the impedance of the impedance variable element 5 so that the impedance obtained by combining these pieces of input impedance and the impedance of the impedance variable element 5 corresponds to the impedance Zi described in Step S5 of FIG. 2. In addition, for the initial value described in Step S21 of FIG. 2, it is only necessary to set the impedance of the impedance variable element 5 so that the combined impedance becomes the same as the characteristic impedance Z0.

Second Embodiment

Figure 5:
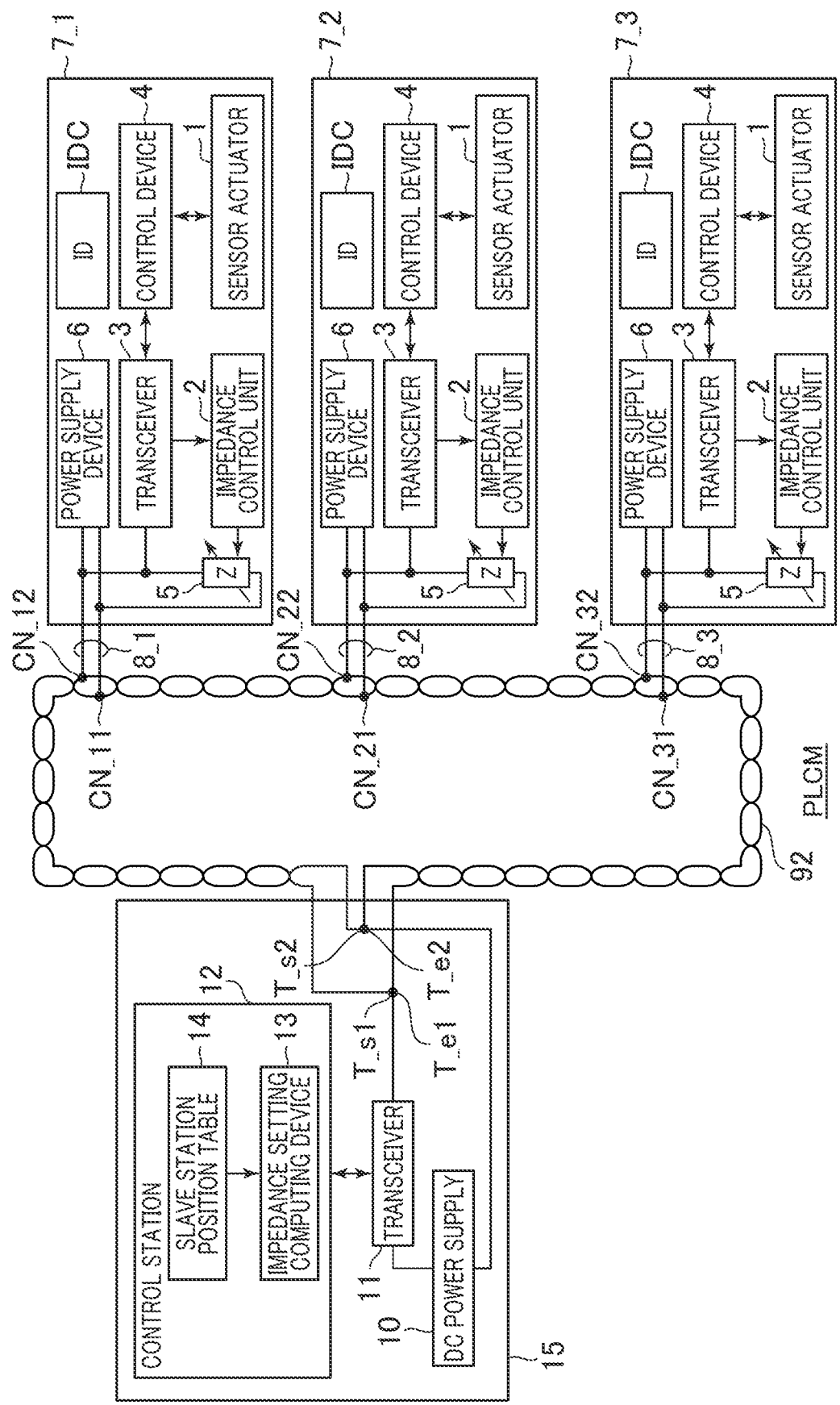
FIG. 5 is a block diagram for showing a configuration of a communication device according to a second embodiment.

FIG. 5 is a block diagram for showing a configuration of a communication device PLCM according to a second embodiment. Since FIG. 5 is similar to FIG. 1, different points will be mainly described.

In the first embodiment, the ring-type transmission line 9 is configured using unbalanced lines. That is, the ring-type transmission line 9 is configured using the signal wiring and the grounding wiring. On the contrary, a ring-type transmission line 92 is configured using twisted pair parallel lines in the second embodiment. A start point T_s1 and an end point T_e1 of one wiring of the parallel lines are connected to the master station-side transceiver 11, and a start point T_s2 and an end point T_e2 of the other wiring are connected to the DC power supply device 10 of the master station 15. For example, one wiring and the other wiring are arranged while being periodically crossed so as to be twisted.

The slave station 7_1 is connected to one wiring and the other wiring configuring the ring-type transmission line 92 at a pair of connection positions CN_11 and CN_12. In the slave station 7_1, the impedance variable element 5 and the power supply device 6 are connected between the pair of connection positions CN_11 and CN_12 through the T-type branch part 8_1. In addition, the slave station-side transceiver 3 is connected to the connection position CN_12 through the T-type branch part 8_1.

The other slave stations (7_2, 7_3, and the like) are configured in the same manner as the slave station 7_1. A value is set to the impedance variable element 5 in the slave station in accordance with the connection position as similar to the first embodiment.

The twisted pair parallel lines are used as the ring-type transmission line 92 in the communication device PLCM according to the second embodiment as compared to the first embodiment, and thus radiated electromagnetic noise can be reduced. In addition, the influence on communications due to induction noise can be reduced.

Third Embodiment

Figure 6:
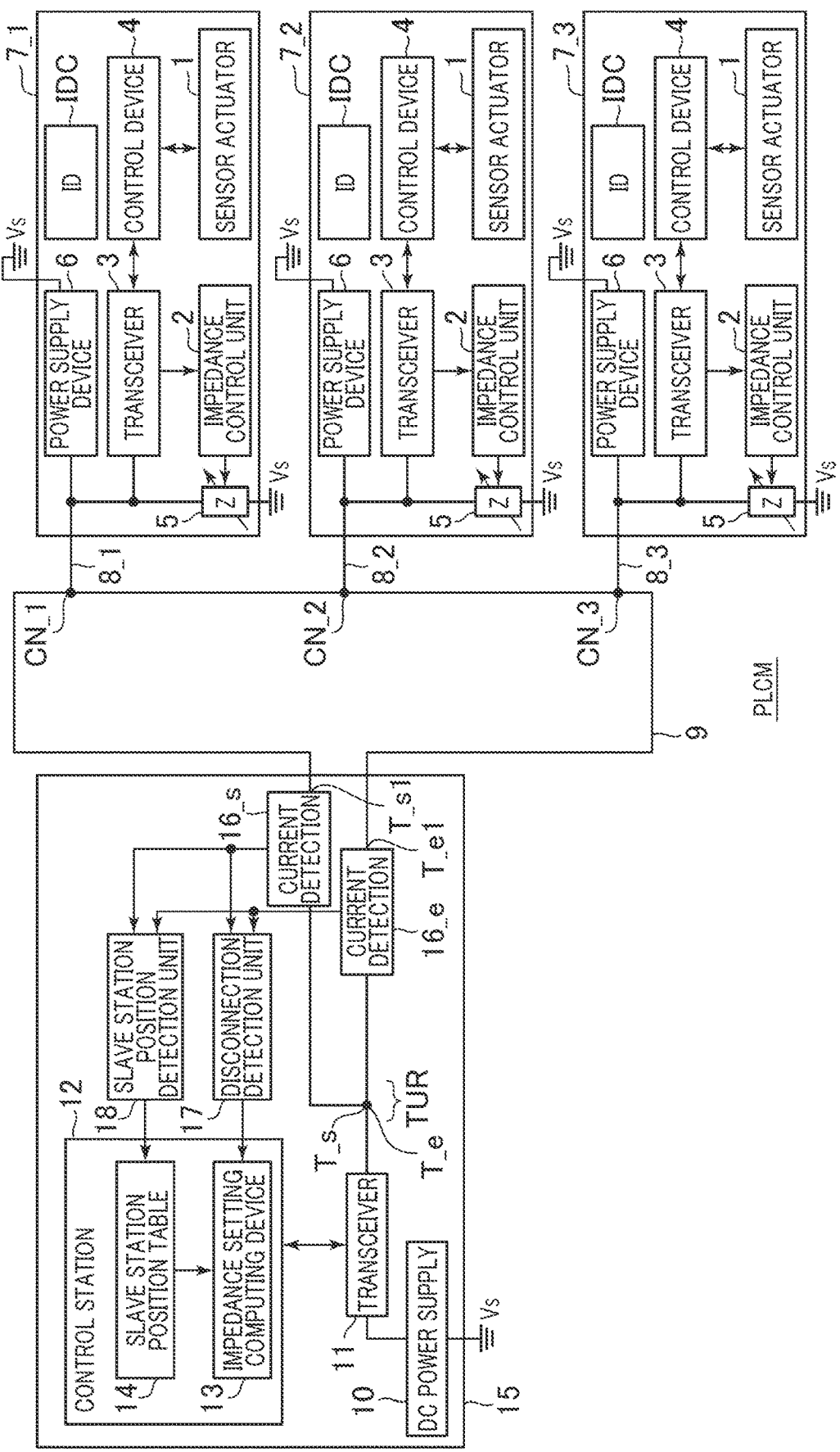
FIG. 6 is a block diagram for showing a configuration of a communication device according to a third embodiment.

FIG. 6 is a block diagram for showing a configuration of a communication device PLCM according to a third embodiment. Since FIG. 6 is similar to FIG. 1, different points will be mainly described.

In the communication device PLCM according to the third embodiment, the configuration of the master station 15 is different from that in the first embodiment. The configurations of the slave stations 7_1 to 7_3 are the same as those in the first embodiment, and thus the explanation thereof will be omitted. As similar to the master station of the first embodiment, the master station 15 includes the DC power supply device 10, the master station-side transceiver 11, and the control station 12. Further, the master station 15 according to the third embodiment includes two current detection circuits 16_s and 16_e, a disconnection detection unit 17, and a slave station position detection unit 18.

The master station-side transceiver 11 is connected to a two-branching part TUR. In the case where data is transmitted, a communication signal waveform according to the data to be transmitted is supplied to the two-branching part TUR. In addition, when receiving data, the master station-side transceiver 11 forms reception data on the basis of the communication signal waveform at the two-branching part TUR. The start point T_s and the end point T_e of the ring-type transmission line 9 are connected to the two-branching part TUR. In the ring-type transmission line 9, the current detection circuit 16_s is connected between a position T_s1 closer to the start point T_s and the start point T_s. Likewise, the current detection circuit 16_e is connected between a position T_e1 closer to the end point T_e and the end point T_e.

ADC voltage formed by the DC power supply device 10 is applied to the two-branching part TUR, and is transmitted to the position T_s1 of the ring-type transmission line 9 through the current detection circuit 16_s. At the same time, the DC voltage is transmitted to the position T_e1 of the ring-type transmission line 9 through the current detection circuit 16_e. Accordingly, a DC voltage is fed from the both end sides of the ring-type transmission line 9 as similar to the first embodiment.

In addition, the communication signal waveform supplied to the two-branching part TUR is transmitted to the position T_s1 of the ring-type transmission line 9 through the current detection circuit 16_s. At the same time, the communication signal waveform is transmitted to the position T_e1 of the ring-type transmission line 9 through the current detection circuit 16_e. Further, the communication signal waveforms at the position T_s1 and the position T_e1 of the ring-type transmission line 9 are transmitted to the two-branching part TUR through the current detection circuits 16_s and 16_e. Accordingly, in the case where no disconnection has occurred, communications between the master station 15 and the slave station are performed at the both ends of the ring-type transmission line 9.

The current detection circuit 16_s measures a current value flowing between the start point T_s and the position T_s1 therethrough. Likewise, the current detection circuit 16_e measures a current value flowing between the endpoint T_e and the position T_e1 therethrough. That is, the current detection circuit 16_s measures a clockwise current flowing from the start point T_s towards the end point T_e, and the current detection circuit 16_e measures a counterclockwise current flowing from the end point T_e towards the start point T_s.

The current values measured by the current detection circuits 16_s and 16_e are supplied to the disconnection detection unit 17 and the slave station position detection unit 18 to detect disconnection and the position of the slave station.

In the case where the slave station generates a communication current and a clockwise communication current or a counterclockwise communication current cannot be monitored by the current detection circuit 16_s or 16_e, the disconnection detection unit 17 determines that disconnection has occurred in the ring-type transmission line 9. When the slave station transmits data, a communication current in accordance with the transmission data flows in the ring-type transmission line 9. If no disconnection has occurred, the clockwise communication current and the counterclockwise communication current in accordance with the communication current flow, and are measured by the current detection circuits 16_s and 16_e. On the contrary, for example, in the case where the ring-type transmission line 9 has been disconnected between the slave stations 7_1 and 7_2, the communication current generated by the slave station 7_1 can be monitored as the clockwise communication current by the current detection circuit 16_s, but the current detection circuit 16_e cannot monitor the current as the counterclockwise communication current. Accordingly, the disconnection detection unit 17 can determine whether or not disconnection has occurred. In the case where it is determined by the disconnection detection unit 17 that disconnection has occurred, the communication device PLCM promptly outputs an abnormal alarm to the host system (including a high-order application layer), but the present invention is not limited to this.

The slave station position detection unit 18 monitors the communication current generated by the slave station and/or the operating current of the slave station as clockwise and counterclockwise current values, so that the connection position of the slave station in the ring-type transmission line 9 is detected. In the case where no disconnection has occurred, the communication current and/or operating current of the slave station propagate/propagates in the ring-type transmission line 9 to reach the start point T_s and the end point T_e. At this time, a ratio of the value(s) of the clockwise communication current and/or operating current to the value(s) of the counterclockwise communication current and/or operating current becomes equal to a ratio of the transmission line length in the counterclockwise direction from the slave station to the master station 15 to the transmission line length in the clockwise direction from the slave station to the master station 15. That is, the ratio becomes equal to a ratio of the physical distance between the connection position to which the slave station is connected and the end point T_e to the physical distance between the connection position to which the slave station is connected and the start point T_s.

The slave station position detection unit 18 monitors the clockwise and counterclockwise current values using the current detection circuits 16_s and 16_e, extracts the communication current generated by the slave station on the basis of the monitored currents, and extracts only a component of the communication current generated by a specific slave station. In addition, the slave station position detection unit 18 obtains a ratio of the clockwise current value of the extracted communication current to the counterclockwise current value thereof, and calculates the connection position information using the obtained ratio of the current values as the connection position of the specific slave station based on the total length (entire length) of the ring-type transmission line 9. For example, if the total length of the ring-type transmission line 9 has been known in advance, the connection positions (CN_1 to CN_3 of FIG. 1 and FIG. 3) can be calculated on the basis of the current ratio, and the connection position information (L1 to L3) can be formed using the calculated connection positions as described in FIG. 3.

For example, the slave stations are registered in advance in the slave station position table 14 included in the control station 12, but the connection position information of the slave stations is not described. For example, the connection position information L1 to L4 is removed from the slave station position table 14 shown in FIG. 2. The connection position information calculated by the slave station position detection unit 18 is supplied to the slave station position table 14, and is described in the table.

In the case where it is determined by the disconnection detection unit 17 that no disconnection has occurred, the impedance setting computing device 13 executes the computation described in Step S5 of FIG. 2 using the connection position information described in the slave station position table 14, but the present invention is not particularly limited to this.

According to the third embodiment, even if the connection position of the slave station has not been known in advance, the input impedance of the slave station can be set by setting the value of the impedance variable element of the slave station in accordance with the connection position of the slave station.

An example of calculating the connection position information in the slave station position detection unit 18 has been described, but the present invention is not limited to this. In the above-described configuration, the absolute distance of the length of the transmission line from the master station 15 to a specific slave station cannot be obtained. However, the absolute distance is not necessary in the equation shown in Step S5 of FIG. 2, and it is only necessary to obtain a ratio to the total length (entire length) of the ring-type transmission line 9. Therefore, ratios may be described as the connection position information in the slave station position table 14. In this case, the impedance setting computing device 13 calculates the impedance of the slave station on the basis of the ratio.

An example in which the slave station position detection unit 18 extracts the communication current generated by the slave station on the basis of the currents measured by the current detection circuits 16_s and 16_e, and only a component of the communication current generated by a specific slave station is extracted has been described, but the present invention is not limited to this. For example, only a component of a current for position detection that is particularly generated by the slave station only when detecting the position may be extracted, or the operating current of the slave station may be extracted.

It should be noted that the ends of the ring-type transmission line 9 connected to the two-branching part TUR are the start point T_s and the endpoint T_e in the description. However, the positions T_s1 and T_e1 may be used as the start point T_s and the end point T_e of the ring-type transmission line 9. In addition, the two current detection circuits 16_s and 16_e can be collectively regarded as a current detector.

Fourth Embodiment

Figure 7:
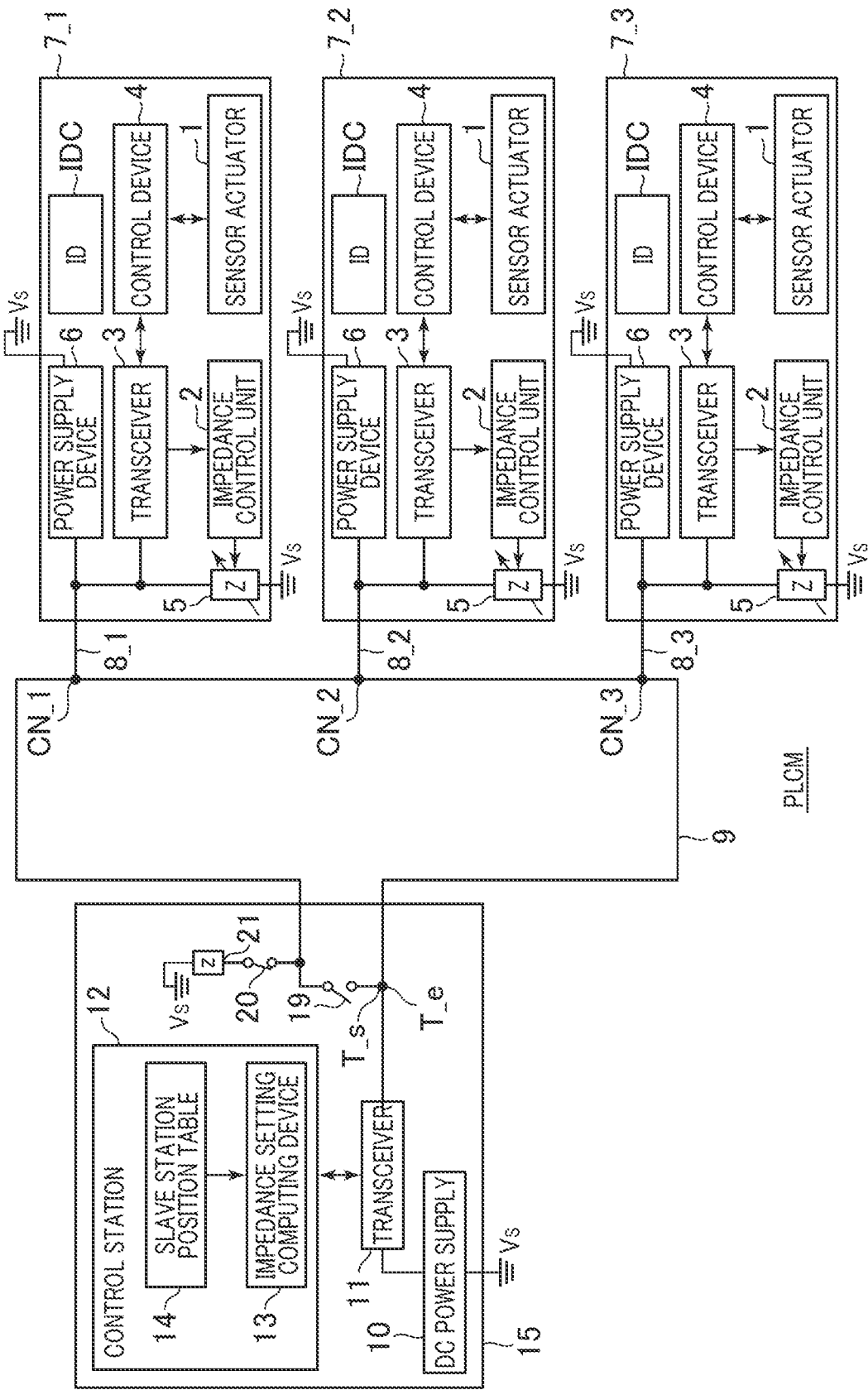
FIG. 7 is a block diagram for showing a configuration of a communication device according to a fourth embodiment.

FIG. 7 is a block diagram for showing a configuration of a communication device PLCM according to a fourth embodiment. Since FIG. 7 is similar to FIG. 1, different points will be mainly described. In the communication device PLCM shown in FIG. 7, the slave stations 7_1 to 7_3 are the same as those described in the first embodiment, and thus the explanation thereof will be omitted. As similar to the first embodiment, the master station 15 includes the DC power supply device 10, the master station-side transceiver 11, and the control station 12. In the fourth embodiment, the master station 15 further includes switches 19 and 20 and a termination resistor 21.

The start point T_s and the end point T_e of the ring-type transmission line 9 are connected to each other through the switch 19. In the fourth embodiment, the end point T_e is connected to the master station-side transceiver 11, but the present invention is not particularly limited to this. In addition, the start point T_s is connected to one terminal of the termination resistor 21 through the switch 20, and the other terminal of the termination resistor 21 is connected to the ground voltage Vs. Although not shown in the drawing, the master station 15 includes a control circuit, and the switches 19 and 20 are turned on or off by the control circuit. An example of the timing when the switches 19 and 20 are turned on or off will be described later.

In the first embodiment, in order to set the input impedance of the slave station in accordance with the connection position of the slave station, the master station 15 and each slave station are temporally shifted to the low-speed communication mode. On the contrary, in the communication device PLCM of the fourth embodiment, the shift to the low-speed communication mode is not necessary.

With reference to the flow shown in FIG. 2, an operation of the communication device PLCM according to the fourth embodiment will be described as follows. Immediately after the power supply of the communication device PLCM is turned on (Step S1: power ON), the control circuit in the master station 15 turns off the switch 19, and turns on the switch 20. When the switch 19 is turned off, the start point T_s of the ring-type transmission line 9 is electrically separated from the master station-side transceiver 11. Accordingly, the ring-type transmission line 9 is connected to the master station 15 as a line-type transmission line. In addition, when the switch 20 is turned on, the start point T_s of the ring-type transmission line 9 changed to the line-type is connected to the termination resistor 21 through the switch 20. In the fourth embodiment, the input impedance of the slave station 7_1 immediately after the power supply is turned on is sufficiently high as compared to the characteristic impedance Z0 of the ring-type transmission line 9. This is set in, for example, Step S21 of FIG. 2.

Accordingly, the termination resistor 21 is connected to only the start point of the ring-type transmission line 9 changed to the line-type, and a transmission line having ideal transmission characteristics as communications between the master station 15 and the slave stations can be configured. Since the ring-type transmission line 9 changed to the line-type has ideal transmission characteristics, it is possible to reduce the disturbance of the communication signal waveform caused by a reflection wave and the like. As a result, the master station 15 and all the slave stations can be operated in the high-speed communication mode immediately after the power supply is turned on without being shifted to the low-speed communication mode (Steps S2 and S22). That is, even if the low-speed communication mode is not provided as a communication mode, communications between the master station 15 and each slave station can be performed in the high-speed communication mode before setting the input impedance of the slave station. It should be noted that since the shift to the low-speed communication mode is not necessary, Steps S8, S9, S26, and S27 shown in FIG. 2 are not necessary.

After the input impedance of the slave station is set in the high-speed communication mode, the control circuit of the master station 15 turns on the switch 19 and turns off the switch 20. Accordingly, the start point T_s of the transmission line is also connected to the master station-side transceiver 11, and the ring-type transmission line resistant to disconnection can be configured.

According to the fourth embodiment, even when the input impedance of the slave station is set in accordance with the connection position, the master station and the slave stations can be operated in the high-speed communication mode, and thus the communication device PLCM can be set at a high speed. It is obvious that the start point T_s may be connected to the master station-side transceiver 11, and the endpoint T_e may be connected to the termination resistor 21 through the switch 20.

Since the communication device PLCM according to each of the first to fourth embodiments is mounted in an automobile, the manufacturing cost can be reduced and the fuel efficiency can be improved while maintaining the reliability.

The invention achieved by the inventors has been concretely described above on the basis of the embodiments. However, it is obvious that the present invention is not limited to the above-described embodiments, and can be variously changed without departing from the scope thereof.

What is claimed is:

1. A communication device comprising:
a master station;
a ring-type transmission line whose start point and end point are connected to the master station; and
a plurality of slave stations connected to the ring-type transmission line in parallel,
wherein the master station transmits a signal and feeds electric power from both of the start point and the endpoint of the ring-type transmission line, and
wherein each of the plurality of slave stations includes an impedance variable element, and the impedance variable elements are connected to the ring-type transmission line in parallel.

2. The communication device according to claim 1,
wherein the master station transmits an impedance value in accordance with a connection position where a slave station is connected in the ring-type transmission line.

3. The communication device according to claim 2,
wherein each of the plurality of slave stations includes an impedance control unit that sets an impedance value to the impedance variable element in accordance with the impedance value transmitted from the master station.

4. The communication device according to claim 3,
wherein the master station includes:
a table in which connection position information related to connection positions to which the plurality of slave stations is connected is described; and
a computing device that calculates the impedance values of the impedance variable elements in the plurality of slave stations on the basis of the connection position information described in the table.

5. The communication device according to claim 3,
wherein the master station includes:
a current detector that measures a current flowing in the clockwise direction in the ring-type transmission line and a current flowing in the counterclockwise direction; and a position detection unit that detects the connection position of a slave station on the basis of the currents measured by the current detector.

6. The communication device according to claim 5, wherein the position detection unit forms connection position information on the basis of the detected connection position of the slave station, and wherein the master station includes:

a table in which the connection position information formed by the position detection unit is described; and a computing device that calculates the impedance values of the impedance variable elements in the plurality of slave stations on the basis of the connection position information described in the table.

7. The communication device according to claim 3, wherein a data transfer rate when the master station transmits the impedance value set to the impedance variable element is lower than a rate after the impedance value is set to the impedance variable element.

8. The communication device according to claim 3, wherein when the master station transmits to the slave station the impedance value set to the impedance variable element, a termination resistor is connected to a line-type transmission line changed from the ring-type transmission line.

9. The communication device according to claim 3, wherein the slave station includes a power supply device that is connected to the impedance variable element in parallel and to which electricity is fed from the ring-type transmission line.

10. An automobile comprising:

the communication device according to claim 1; and a sensor and/or an actuator, wherein a slave station in the communication device includes a control device that controls the sensor and/or the actuator.

* * * * *